United States Patent [19]

Giblet

[11] Patent Number: 5,056,695
[45] Date of Patent: Oct. 15, 1991

[54] LUGGAGE CARRIER ASSEMBLY

[76] Inventor: Allen L. Giblet, 137 Quail Dr., Cordell, Okla. 73632

[21] Appl. No.: 492,734

[22] Filed: Mar. 12, 1990

Related U.S. Application Data

[63] Continuation-in-part of Ser. No. 100,568, Sep. 24, 1987, Pat. No. 4,907,728.

[51] Int. Cl.$^5$ ................................................ B60R 9/06
[52] U.S. Cl. ............................ 224/42.01; 224/42.03 A; 224/42.44; 190/18 A; 190/24; 40/204
[58] Field of Search ..................... 224/42.01, 42.03 R, 224/42.03 A, 42.04, 42.06, 42.07, 42.08, 42.32–42.35, 42.43, 42.44, 310, 321; 5/119; 220/9.1; 190/18 A, 19, 23, 24, 26, 124, 125, 127, 37; 40/204

[56] References Cited

U.S. PATENT DOCUMENTS

| | | | |
|---|---|---|---|
| 256,578 | 4/1882 | Mantz | 190/24 |
| 261,753 | 7/1882 | Patterson | 190/24 |
| 790,483 | 5/1905 | Demartini | 190/19 X |
| 996,278 | 6/1911 | Provandie | 40/204 |
| 1,280,761 | 10/1918 | Kirkpatrick et al. | 224/42.44 |
| 1,448,599 | 3/1923 | Schmitt | 40/204 |
| 1,567,388 | 12/1925 | Rohne | 224/42.01 X |
| 1,569,600 | 1/1926 | Allbright | 5/119 |
| 1,666,507 | 4/1928 | Puffe | 224/42.44 |
| 1,689,736 | 10/1928 | Massopust | 190/26 |
| 1,712,612 | 5/1929 | Halladay | 190/19 |
| 1,797,229 | 3/1931 | Giffel | 5/119 |
| 1,828,128 | 10/1931 | Criner | 224/42.44 |
| 1,913,256 | 6/1933 | Widener | 224/42.44 |
| 1,925,613 | 9/1933 | Stanger | 224/42.44 X |
| 2,069,345 | 2/1937 | Widman | 296/37 |
| 2,244,091 | 6/1941 | Wein | 190/127 |
| 2,848,271 | 8/1958 | Reilly | 296/37 |
| 3,082,033 | 3/1963 | Bosher | 296/26 |
| 3,295,643 | 1/1967 | Peterson et al. | 190/125 X |
| 3,842,953 | 10/1974 | Royet | 190/18 A |
| 3,913,811 | 10/1975 | Spencer | 224/42 |
| 3,999,693 | 12/1976 | Cooper, Sr. | 224/42.03 A |
| 4,065,166 | 12/1977 | Shoemaker | 296/23 |
| 4,907,728 | 3/1990 | Giblet | 224/42.03 A |
| 4,951,818 | 8/1990 | Johnson | 190/127 X |

Primary Examiner—Henry J. Recla
Assistant Examiner—Casey Jacyna
Attorney, Agent, or Firm—Laney, Dougherty, Hessin & Beavers

[57] ABSTRACT

A luggage carrier for attachment to the rear side of a vehicle and including an external bottom frame having channel means for pivotally supporting the carrier on a receiver post projecting rearwardly at about the level of the vehicle bumper. The luggage carrier further includes an internal frame having a bottom subframe portion, a pair of lateral subframes and a forward, vertically extending subframe. A rigid panel is secured to the forward vertically extending subframe. An arcuate closure subassembly is pivotally connected to the upper side of the forward subframe, and is pivotable to a position covering the opening at the top of the luggage carrier. The internal frame is covered by a flexible fabric sleeve or encasement, and vinyl pads are interposed between the fabric encasement and the frame to smooth the flexible fabric of the encasement. A closure support subassembly is foldably mounted internally in the luggage carrier and can be folded into a position to prop the closure subassembly in a contents-accessing position.

20 Claims, 4 Drawing Sheets

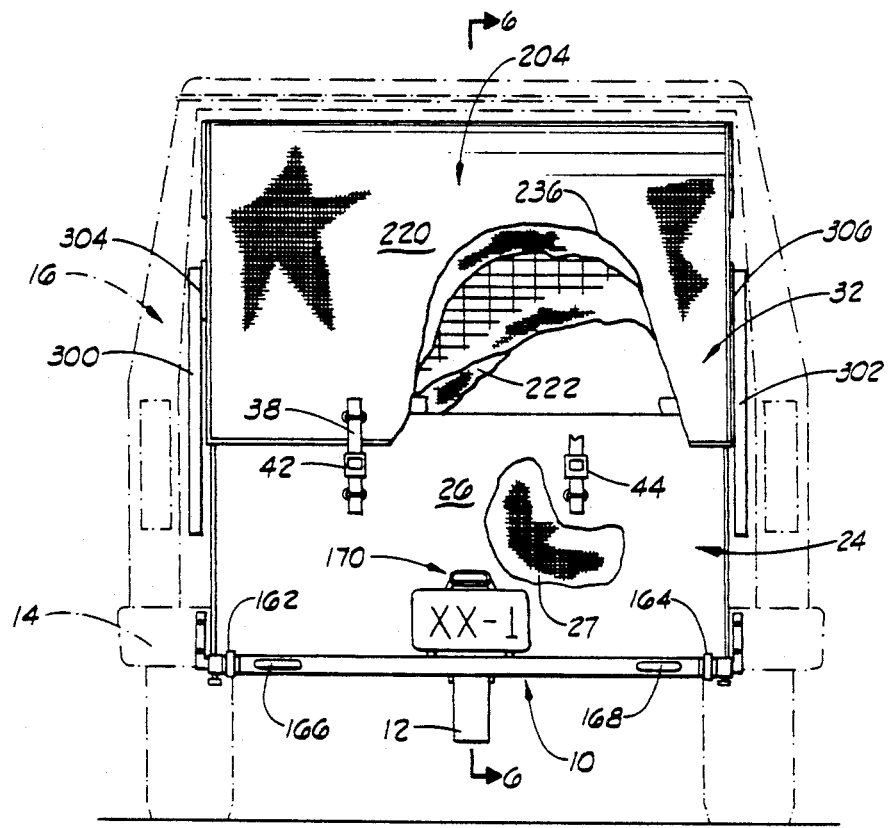
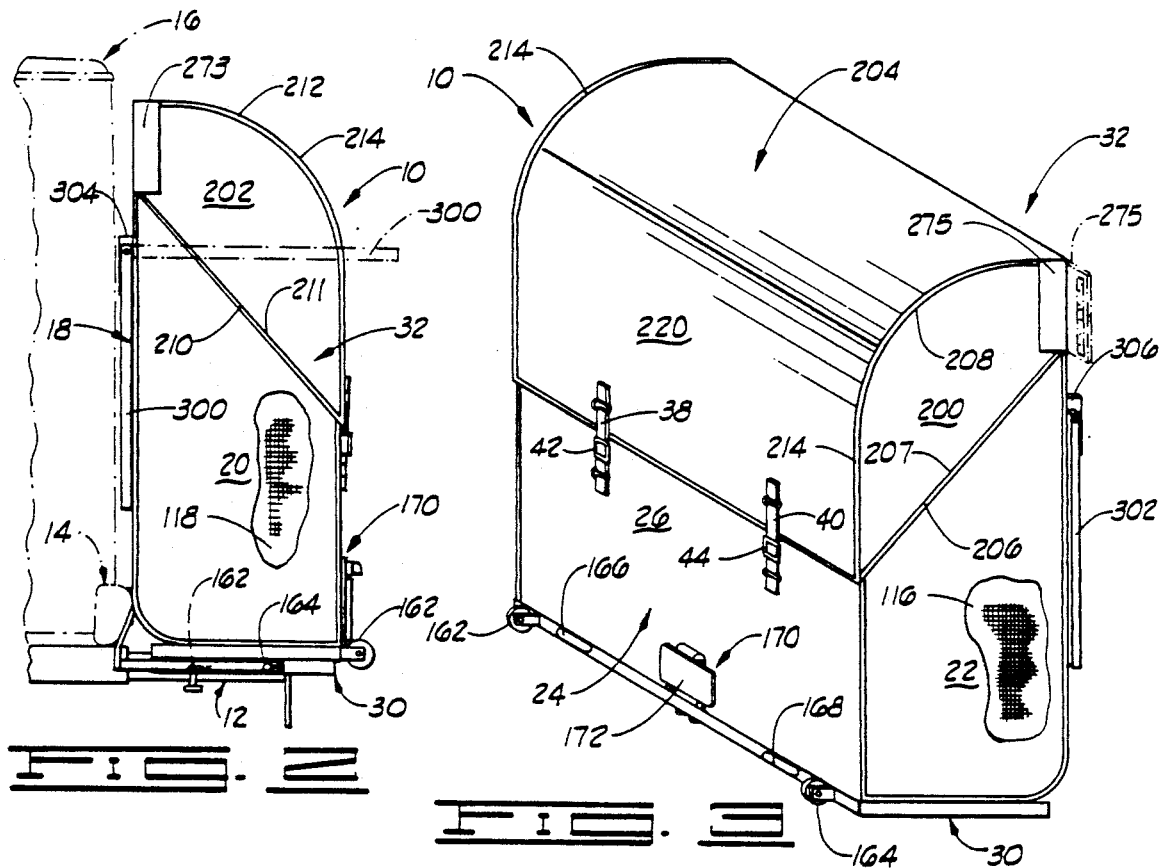

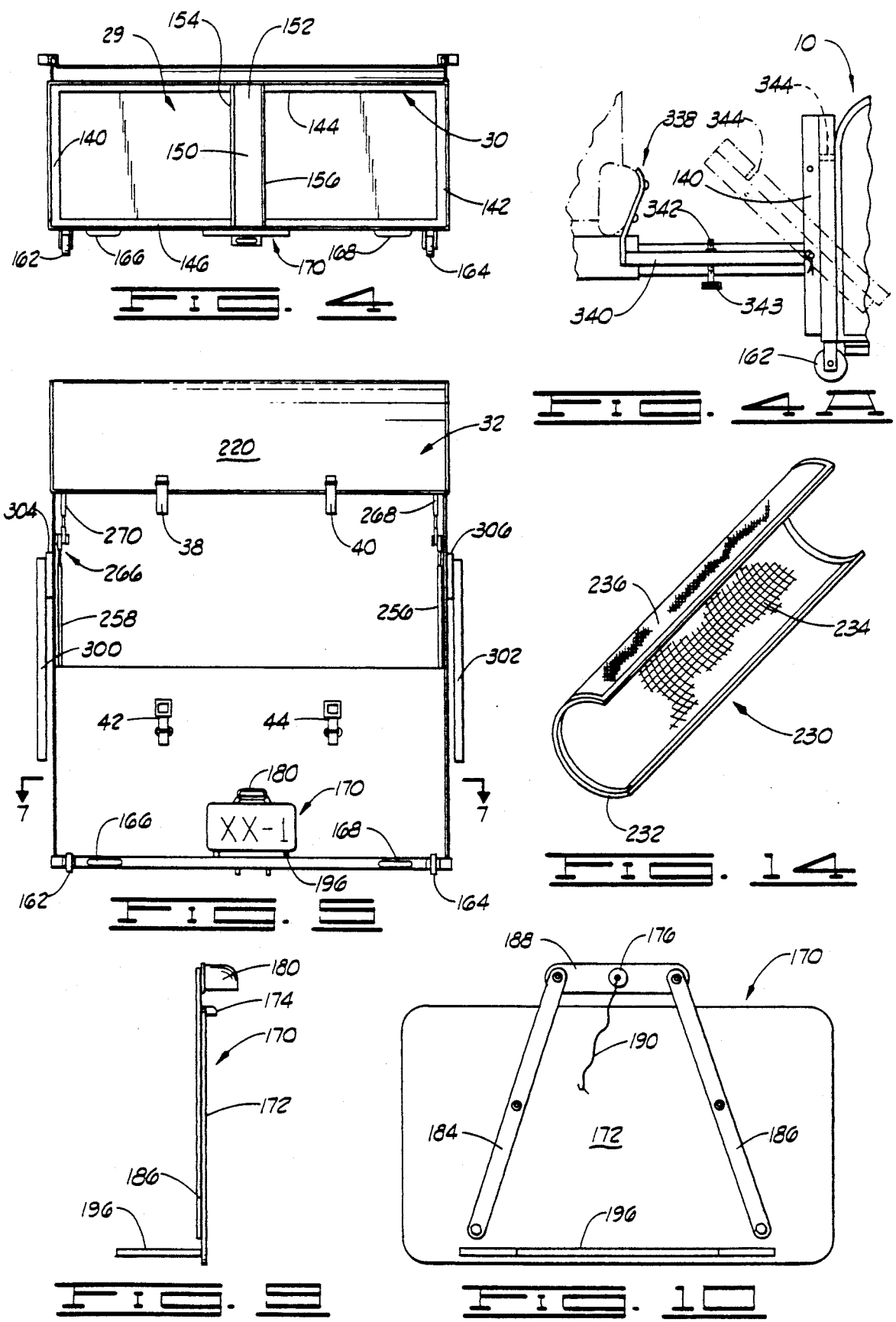

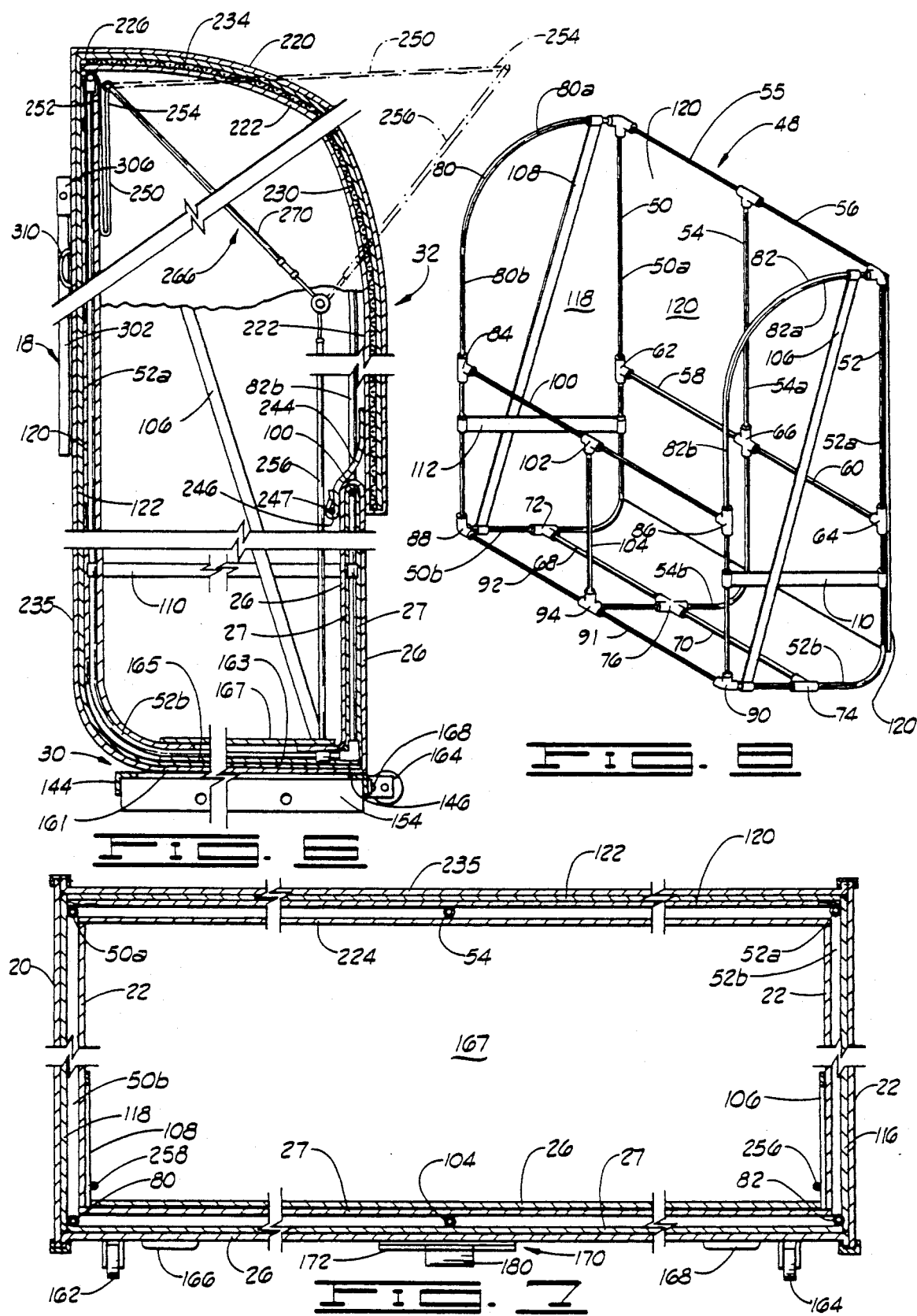

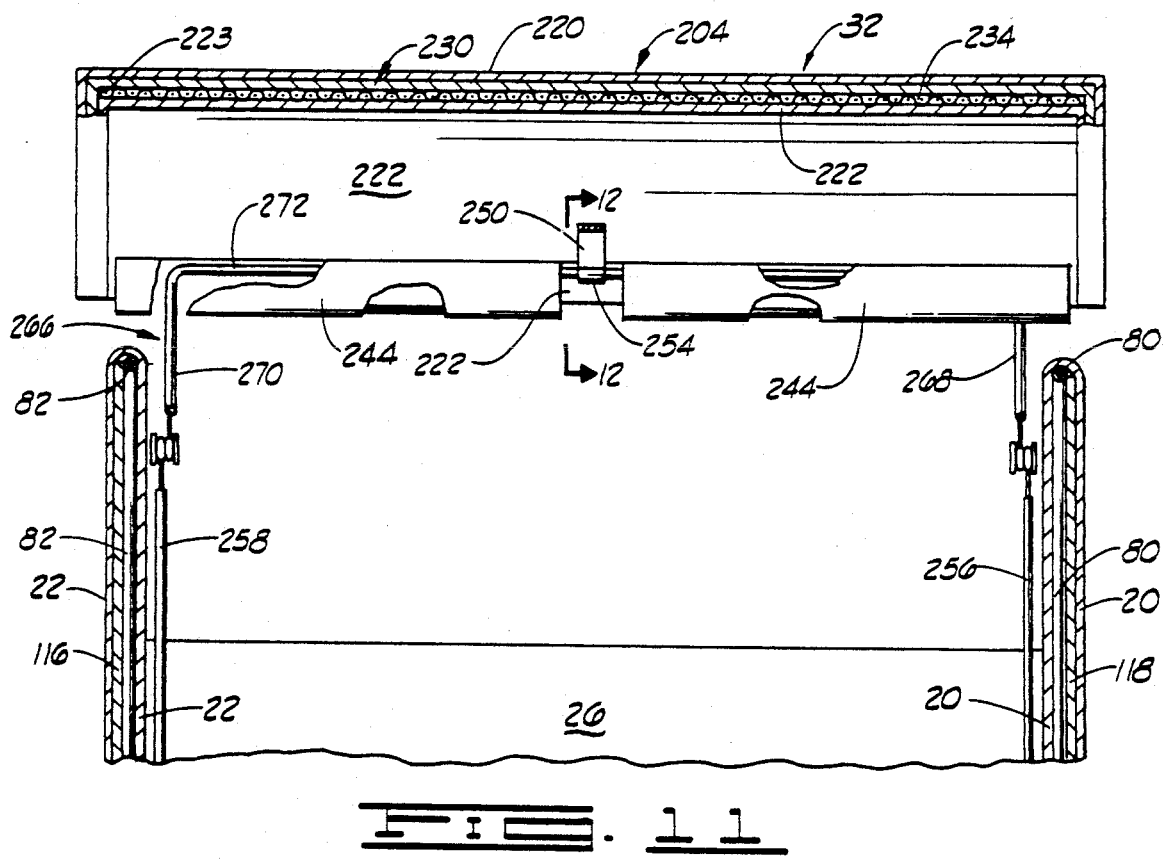
FIG. 11
FIG. 12
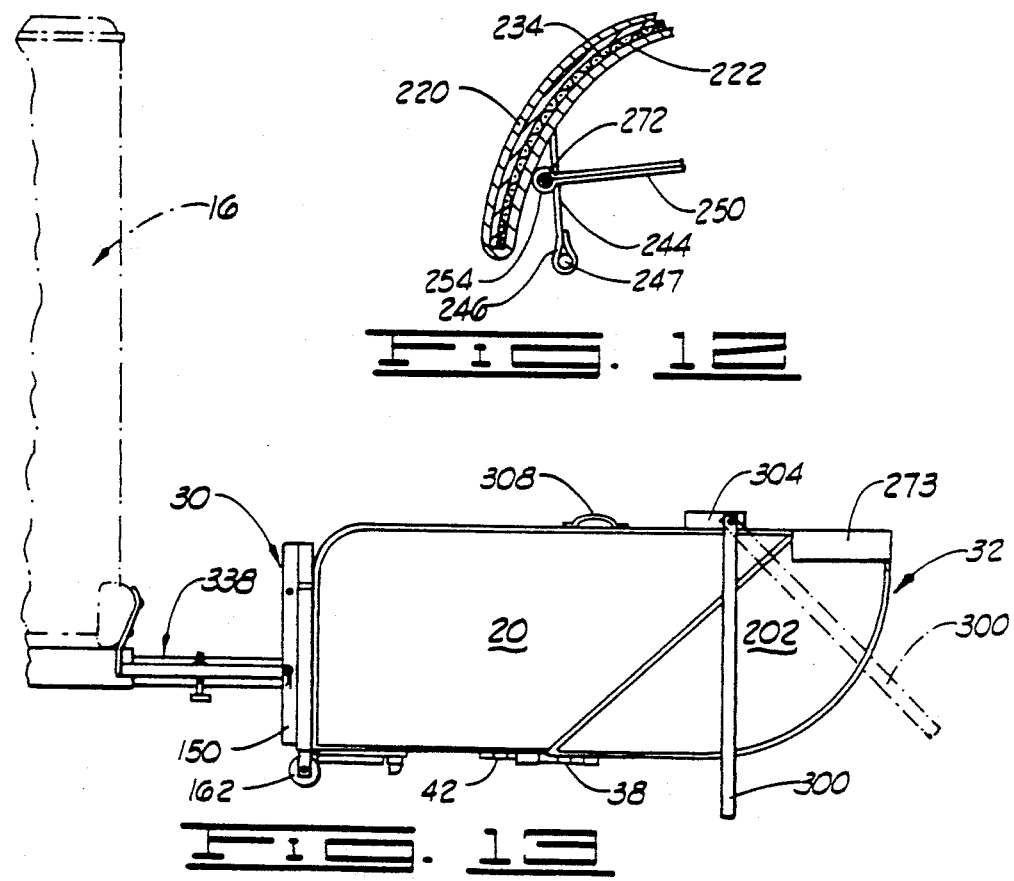
FIG. 13

LUGGAGE CARRIER ASSEMBLY

RELATED APPLICATION

This application is a continuation-in-part of my U.S. patent application Ser. No. 07/100,568, filed on Sept. 24, 1987 which issued to U.S. Pat. No. 4,907,728 on Mar. 13, 1990.

FIELD OF THE INVENTION

This invention relates to vehicle mounted luggage carriers, and more particularly, to luggage carriers which are particularly adapted to be mounted to the rear side of a van or similar vehicle for carrying large amounts of luggage, and which can be pivoted downwardly to a horizontally extending position, and quickly and easily detached from the rear of the vehicle when it is desired to move the luggage to a different location while it is still stowed in the luggage carrier.

BACKGROUND OF THE INVENTION

Brief Description Of The Prior Art

Many types of enclosures for storing and carrying luggage on vehicles have heretofore been proposed. In some of these, the luggage carrier assembly is adapted to be mounted to the rear side of vehicles for transport over long distances. A particular type of luggage carrier which a few prior patents have disclosed is one which is to be mounted to the rear side of a recreational vehicle, such as a van.

In my co-pending U.S. patent application Ser. No. 100,568, I disclose a luggage carrier particularly suited for mounting to the rear side of a van, or similar vehicle. The luggage carrier there shown will accommodate a substantial amount of luggage, and can be pivoted between an upwardly extending transport position, in which it is supported adjacent the rear doors of the van, and, in part, by the bumper of the van, to a horizontally extending, stationary position. In the latter position, the luggage carrier assembly projects to the rear of the van, and it can be utilized for eating or sleeping, if desired, by reason of the inclusion therein of the rigid, horizontally extending forward side of the luggage carrier assembly. The luggage carrier disclosed in my co-pending U.S. patent application Ser. No. 100,568 can also be quickly detached from the van and easily rolled from an outside location to the interior of a motel or the like with the luggage still retained in the luggage carrier.

Many proposals have been previously advanced which have as their objective, augmenting the luggage carrying capacity of motor vehicles by attaching racks, luggage bins or similar structures to the vehicle to accommodate luggage carried externally of the vehicle.

One type of structure used for increasing the total capacity of a motor vehicle is a tent-like sheath extension enclosure which is demountably secured to the rear side of a motor vehicle, and which is illustrated and described in Shoemaker U.S. Pat. 4,065,166. This tent-like sheath is made to extend at floor level from the rear side of a vehicle of a type having loading doors at the rear thereof, such as vans or the like. The enclosure is retained on the vehicle by brackets secured to the lower frame of the loading door, and by hangers affixed to the laterally opening door panels which normally close the doorway of the vehicle.

This demountable enclosure, once mounted upon the vehicle, cannot be pivoted between its initially mounted status and a second position, but rather remains in an upright, rearwardly extending position at all times. Neither is the luggage enclosure which is illustrated in this patent susceptible to being rested upon the ground and rolled across the ground while the contents of the enclosure remain therewithin.

A portable luggage carrier mountable on the rear side of compact cars is described and illustrated in Cooper U.S. Pat. No. 3,999,693. Such vehicle-mountable luggage carrier includes a housing which is shaped to provide a forwardly facing wall complementary to the rear wall of the automobile upon which it is to be mounted. The devices which ar used for attaching it to the vehicle include bumper-engaging means which enables it to be secured to the rear bumper of the vehicle, and a knee brace which retains it in a horizontally-extending position. The rear wall of the luggage carrier is provided with a license plate recess light and with tail lights so that the requirements concerning vehicle lighting can be satisfied when the luggage carrier is in use. The luggage carrier of the Cooper system is intended to be mounted in only one position on the rear of the compact vehicle to which it is secured, and it cannot be rolled or otherwise moved across a supporting surface, such as a concrete driveway, an asphalt parking lot or the like when it is demounted from the vehicle.

Spencer U.S. Pat. No. 3,913,811 discloses a utility carrier which includes a horizontally-extending supporting platform or framework which is pivotally connected to another framework which extends vertically. Diagonal braces interconnect the vertically extending framework with the horizontally extending framework, and a plurality of clamps are provided for the purpose of attaching the utility carrier to a horizontally-extending structure which is analogous to a vehicle bumper. In one embodiment of the invention, it is possible to pivot the horizontally extending framework or platform upwardly to a position such that the utility carrier occupies relatively little space at the rear of the vehicle upon which it is mounted.

Reilly U.S. Pat. No. 2,848,271 discloses a tailboard cover for use on open-ended vehicles, such as station wagons. The tailboard referred to is that gate or portion of the station wagon or other vehicle which folds to an up position and in doing so, closes a large portion of the rear wall opening of the vehicle. When pivoted to the down position, it provides a horizontal platform beyond and to the rear of that opening. The tailboard cover contemplated by the Reilly disclosure is a series of frame-forming rods which are covered by canvas panels, and which define an enclosure extending over the horizontally extending tailboard. The entire rear wall opening into the vehicle is thus closed by the protective cover at a time when the tailboard is in the down position, and the volume of the cover is such as to permit luggage and other articles to be disposed within the enclosure while resting upon the horizontally-extending tailboard.

Bosher U.S. Pat. No. 3,082,033 discloses a utility trunk compartment for a passenger automobile vehicle. The utility trunk compartment is adapted to fit within the trunk of the vehicle, and is adapted to carry cargo of unrestricted height. The compartment is a canopy-type enclosure. The function of the utility trunk compartment is to substantially augment the cargo-carrying capacity of the trunk, and to provide a weather-tight covering over the enlarged space within the utility trunk.

Widman U.S. Pat. No. 2,069,345 discloses a trunk compartment provided at the rear of the automobile. A flexible canvas element is used to provide an enclosure between the regular body of the automobile at which the opening to the trunk is defined, and the trunk lid when it is pivoted to the open position. The nature of the structure is such that it may either be made removable from the trunk space, or made a permanent part of the vehicle.

A folding luggage carrier which can be pivotally supported on the rear portion of an automobile, and folded to an operative transport position, or folded downwardly to a horizontally extending position, is shown in Kirkpatrick et al U.S. Pat. No. 1,280,761. No provision is made for transporting this compartment by rolling it across a supporting surface after the compartment has been demounted from the vehicle.

None of the described structures shown in the cited prior art patents afford the versatility and flexibility in use which would be optimum. Moreover, none are specially adapted, in any of the embodiments illustrated or described in the cited patents, to utilization on modern passenger vans which generally, if not universally, include a pair of doors located at the rear side of the van and extending substantially the entire distance from the bumper to the roof of the van. Such doors are usually hung on hinges located at opposite sides of the van. Vans of this type are frequently used for transporting a number of passengers for various business or social occasions, and it is difficult to utilize the van efficiently when the luggage of all of the passengers must be stored inside the van with the passengers. Yet, none of the types of structures illustrated in the described patents is especially useful, if useful at all, on vans of the type described, or upon vehicles which have a very tall or high rear wall expanse from bumper to roof, and which require a capability for being quickly loaded and unloaded with the luggage of a number of passengers.

Brief Description Of The Present Invention

This invention is a luggage carrier assembly of the type which is mountable on a passenger vehicle, or light cargo vehicle, at the outside of the vehicle and is capable of containing a substantial amount of luggage or cargo to be transported from one location to another by over-the-road travel. The luggage carrier assembly is highly utilitarian and accomplishes its remarkable functionality by the inclusion of several novel structural features. The luggage carrier assembly has unusual weather tight integrity to protect the luggage or cargo, and it can very quickly and easily be attached to, and removed from, a variety of types of vehicles. It is particularly well suited for mounting to the rear side of vans. The luggage carrier assembly can moreover be pivoted downwardly to present an upwardly facing horizontally extending sleeping or eating surface.

Broadly described, the luggage carrier assembly of the invention may be considered as broadly including rigid framework and shape imparting structures which are used in combination with a bag or sleeve-type canvas, or other flexible fabric envelope which fits snugly and aesthetically around the rigid framework structures, and, by reason of the integrity and continuity of the fabric panel members of which the envelope is constructed, precludes the infiltration or seepage of water or moisture into the interior of the luggage carrier assembly. The framework structures include a lightweight rigid internal framework which can be lined on the inside and outside with portions of the described fabric envelope structure. The rigid frame structures which are included in the assembly further include an external subframe used for carrying the bulk of the weight of the luggage loaded into the assembly and for mounting the luggage carrier assembly on a vehicle for transport. The luggage carrier assembly is such that it can be easily mounted to the rear side of a full size or mini-van vehicle, and can be quickly placed in either an upright over-the-road travel position, or in a folded down, horizontally extending stationary or at-rest position.

When detached from the vehicle, the construction of the luggage carrier assembly is such that it can be quickly and easily rolled from the vehicle to a place where the luggage is to be unloaded without opening the luggage carrier assembly, and with minimal manual effort on the part of the person thus moving the luggage.

An important object of the invention is to provide a lightweight, attractive, durable weather tight luggage carrier assembly which can be quickly and easily mounted on a vehicle for over-the-road transport, and which can be quickly and easily detached from the vehicle and moved to a location where it is desired to unload and store the luggage carried therein.

A further object of the invention is to provide an improved luggage carrier assembly mountable upon a vehicle for transport from one location to another, and which can be disassembled into several piece quickly and easily to permit each to be maintained, repaired and cleaned as may be necessary.

A further object of the invention is to provide an improved luggage carrier assembly which can be used for transporting luggage contained therein from one location to another when the assembly is attached in an upright position to a van or similar vehicle, and which can be used as an eating or sleeping surface while the luggage is still contained therein at stops temporarily made between the point of origin and the destination of the traveler who is transporting the luggage.

An important object of the present invention is to provide a luggage carrier assembly which can be quickly and easily mounted to the rear of a van or the like, and which can be pivoted between a vertically extending transport position, and a horizontally extending stationary position in which the luggage carrier can be used as a sleeping surface or an eating surface. The luggage carrier of the invention includes an improved closure subassembly by which the luggage carrier can be closed while in its transport status, and an improved construction in terms of the use of an external subframe for providing rigidity, and an internal frame for providing additional mechanical strength.

An important object of the invention is to provide an improved luggage carrier which can be folded down to a horizontally extending eating or sleeping position in which the luggage carrier affords additional horizontal platform surface for many uses.

Another object of the invention is to provide a luggage carrier assembly which can be detached from a vehicle to which it is mounted for transport, and with the luggage still retained therein, then rolled to a position where the luggage can be more conveniently taken out and stored.

Additional objects and advantages of the invention will become apparent as the following detailed description of a preferred embodiment of the invention is read in conjunction with the accompanying drawings which illustrate a preferred embodiment of the invention.

GENERAL DESCRIPTION OF THE DRAWINGS

FIG. 1 is a rear elevation view of the luggage carrier assembly of the invention. A van to which the luggage carrier is mounted is illustrated in dashed lines, and a part of the luggage carrier has been broken away to facilitate better understanding of the construction of the luggage carrier.

FIG. 2 is a side elevation view of the luggage carrier. A leg employed to support the luggage carrier in a horizontal position in a manner hereinafter described, is illustrated in dashed lines as it appears when pivoted to its supporting position. Its transport or over-the-road position is shown in full lines.

FIG. 3 is a perspective view of the luggage carrier assembly.

FIG. 4 is a bottom plan view of the luggage carrier assembly.

FIG. 4A is a side elevation view of certain structural details of the luggage carrier assembly. An alternate operative position of one part is illustrated in dashed lines.

FIG. 5 is a rear elevation view similar to FIG. 1, but illustrating the pivotally attached closure subassembly raised to an elevated position to facilitate the insertion or removal of luggage from the luggage carrier assembly.

FIG. 6 is a vertical sectional view taken along a vertical plane extended through the center of the luggage carrier of the invention along line 6—6 of FIG. 1.

FIG. 7 is a horizontal sectional view taken along line 7—7 of FIG. 5.

FIG. 8 is a perspective view of an internal framework utilized in the luggage carrier of the invention.

FIG. 9 is a side or edge elevation view of a license plate mounting subassembly forming a part of the invention.

FIG. 10 is a rear elevation view of the license plate mounting subassembly shown in FIG. 9.

FIG. 11 is a view, partially in elevation and partially in vertical section, as taken in a vertical plane which extends parallel to the front side of the luggage carrier assembly, and from side-to-side thereof, at a time when the closure subassembly is propped in the open position to allow luggage to be placed in and taken out of the assembly, and as it appears when looking from the inside of the luggage carrier assembly toward the rear.

FIG. 12 is a sectional view taken along line 12—12 of FIG. 11.

FIG. 13 is a side elevation view similar to FIG. 2, but depicting the luggage carrier assembly pivoted downwardly to the horizontally extending, stationary status. A roll away operative status of certain legs forming a part of the assembly is shown in dashed lines.

FIG. 14 is a perspective view of a rigidifying frame subassembly forming a part of the closure subassembly used to open and close the luggage carrier assembly 10.

DETAILED DESCRIPTION OF A PREFERRED EMBODIMENT OF THE INVENTION

The overall general construction and configuration of the luggage carrier assembly of the invention is best depicted in FIGS. 1-4. The luggage carrier assembly is denominated generally by reference numeral 10 and is shown mounted on a telescoping receiving bar 12 which projects from the chassis at a location substantially centrally disposed along an elongated bumper 14. The bumper is a part of a van or similar vehicle 16 shown in dashed lines. A pair of lateral stabilizer strut subassemblies, hereinafter described, also aid in supporting the luggage carrier assembly 10 on the vehicle 16.

The luggage carrier assembly 10 has a forward side 18 (see FIG. 2) which faces, and is positioned immediately adjacent, the van 16. The luggage carrier assembly 10 also has a pair of vertically extending lateral side panels 20 and 22 which, in the illustrated embodiment, extend in substantially parallel planes. The luggage carrier assembly further includes a rear side denominated generally by reference numeral 24. The rear side 24 includes a lower, rearwardly facing panel 26 which forms a part of a continuous flexible fabric cover or sheath to be hereinafter described. The rearwardly facing panel 26 extends across, and is in contact with, a smooth, relatively soft vinyl pad 27.

The luggage carrier assembly 10 also has a bottom or lower side 29 at which is located a generally horizontally extending external subframe, denominated generally by reference numeral 30. The external subframe 30 provides support for the luggage carrier assembly 10 and for the luggage carried therein, and also functions to permit the luggage carrier assembly to be mounted to the receiver bar 12 of the vehicle in a manner hereinafter described. As illustrated in FIGS. 1-4, the luggage carrier assembly 10 is shown in an upright transport position, in which the forward side 18 thereof is located immediately adjacent the rear side of the van 16 or other vehicle upon which it is mounted, and the external subframe extends substantially horizontally.

Another important part of the luggage carrier assembly which can be perceived in FIGS. 1, 3 and 5 is a rigid closure subassembly which is denominated generally by reference numeral 32. The rigid closure subassembly 32 is pivotally supported in the luggage carrier subassembly to permit it to be pivoted about a horizontal axis. In this way, the luggage carrier assembly 10 can be opened to allow luggage to be placed therein, or removed therefrom. The closure subassembly 32 can thus be moved from an opened position to a closed position by pivotation about the horizontal axis. When the rigid closure subassembly 32 is closed, it can be latched in this position by means of a pair of latching subassemblies which include latching elements 38 and 40 carried on the outer side of the closure subassembly, and buckes 42 and 44 carried on the rearwardly facing fabric panel 26.

Rigidity and shape are given to the luggage carrier assembly 10 by an internal framework 48 illustrated in FIG. 8. The internal framework 48 is formed of a plurality of relatively lightweight tubular members bent to a configuration which enables the luggage carrier assembly to be fitted to the rear side of a van, or other vehicle, and to receive and support in the interior thereof a large amount of luggage. The interior framework 48 includes a pair of forward lateral frame elements 50 and 52 which are generally L-shaped in configuration. Each of the frame elements has a vertically extending portion (50a and 52a, respectively), and a horizontally extending portion (50b and 52b, respectively). A centrally located L-shaped frame element 54 is also provided, and includes a vertically extending portion 54a and a relatively short, horizontally extending portion 54b.

A pair of forward top frame members 55 and 56 are used to interconnect the frame elements 50 and 52 and the central frame member 54 at the forward top side of the luggage carrier assembly. A pair of horizontally extending transverse brace members 58 and 60 are also extended between, and interconnect, the side frame members 50 and 52 with the intermediate or central frame member 54 in the manner illustrated in FIG. 8. Connection of the tubular members is effected through suitable tees 62 and 64 and a cross-shaped central connecting fitting 66. In similar fashion, a pair of bottom or transverse frame members 68 and 70 are provided at the lower side of the internal framework 48. These function to interconnect the lateral frame members 50 and 52 and the intermediate frame member 54 through a pair of tees 72 and 74 and an intermediate cross-shaped fitting 76.

The upper and rear side of the internal framework is formed, in part, by a pair of lateral frame elements 80 and 82. The elements 80 and 82 include respective arcuate or curved upper portions 80a and 82a, and also include vertically extending lower portions 80b and 82b, respectively. Vertically extending lower portions 80b and 82b are passed through T-fittings 84 and 86 and are secured at their lower ends to a pair of L-shaped T-fittings 88 and 90.

The L-shaped T-fittings 88 and 90 are used for joining transverse rear frame members 91 and 92 to the lateral frame elements 80 and 82. Thus, one end of the lower rear frame member 92 is secured to the T-sleeve 88 and the other end of this frame element is received in a central T-sleeve 94. A second transverse rear frame element or member 96 has one of its ends received in the T-fitting 94 and its other received in the T-fitting 90. Transversely extending, substantially horizontal central frame element 100 is passed through a central T-fitting 102, and has its opposite ends received in the T-fittings 84 and 86 as shown in FIG. 8. A central, vertically extending lower frame element 104 is provided and has its upper end received in the T-fitting 102 and its lower end received in the T-fitting 94.

The tubular internal framework 48 is further reinforced and strengthened by a first diagonal flexible reinforcing strap 106 and also by a second diagonal reinforcing strap 108. Each of these reinforcing straps extends across one of the lateral vertical faces of the internal frame 48. Thus, the strap 106 has one of its ends secured to the upper end of the arcuate or curved portion 82a of the lateral frame element 82, and has its lower end secured to the rear portion of the horizontally extending leg 52b of the frame element 52. In similar fashion, the strap 108 has its upper end secured near the end of the arcuate portion 80a of the frame element 80 and its lower end secured to the lower rear end portion of the frame element 50b. The flexible reinforcing straps 106 and 108 function to strengthen the frame elements 80 and 82, and to retain the bow or curvature of these elements and strengthen them to resist straightening loads imposed thereupon by luggage loaded into the luggage carrier assembly.

In order to still further strengthen the internal framework 48, a pair of fore-and-aft flexible reinforcing straps 110 and 112 are extended between the forward frame elements 50 and 52 and the rear frame elements 80 and 82 at the opposite sides of the internal frame.

Secured to the opposite side faces of the internal frame 48 so as to cover the space between the frame elements 82 and 52 at one side of the frame and the space between the frame elements 80 and 50 at the other side of the frame, are a pair of substantially identical vinyl cushioning panels (see FIGS. 2, 3, 7 and 8). One of these vinyl panels or pads on the right side of the frame between the frame elements 82 and 52 is denominated by reference numeral 116 (see FIGS. 3 and 7), and the vinyl panel or pad on the opposite side of the internal frame is denominated by reference numeral 118 (the latter panel is illustrated in FIGS. 2 and 7). These vinyl pads 116 and 118 are secured to the tubular frame elements forming the opposite sides of the internal frame by any suitable securing means, such as by an appropriate adhesive or bonding material. The vinyl pads 116 and 118 are formed to fit precisely into the opening between the respective rigid frame elements and, in addition, to be slightly larger than such openings so as to be able to cover the frame elements themselves. As will become apparent from the ensuing description, the use of such underlying soft, smooth vinyl pads to underlie exterior panels is prevalent throughout the luggage carrier assembly 10.

Secured across the forward side 18 of the internal framework 48 is a flat, rigid, mechanically strong structural element in the form of a plate or panel 120 of generally rectangular configuration. The rectangular panel 120 can be made of plywood, or preferably Masonite ®, and is secured to the tubular members 50, 52, 54, 58 and 60 by any suitable fastening elements. One function of the rigid panel 120 is to strengthen the internal frame 48. Perhaps more importantly, it also functions to provide a sufficiently strong and rigid surface that it can be used for a sleeping surface, or as a table, at a time when the luggage carrier assembly 10 is pivoted from a vertically extending travel position to a horizontally extending eating or sleeping position when the van or vehicle to which it is attached has stopped. A flexible, smooth pad, such as a vinyl pad 122 of a substantially greater length than the Masonite ® panel 120, is secured to the outwardly facing, forward side of the rigid panel, using a suitable adhesive or bonding agent, or suitable fasteners.

The details of construction of the external subframe 30 which is a part of the luggage carrier assembly of the invention is best illustrated in FIGS. 1–4. The external subframe 30 is of generally rectangular configuration and includes a pair of spaced, parallel, lateral front-to-rear angle iron frame elements 140 and 142. The lateral angle iron frame elements 140 and 142 are interconnected by the rear angle iron frame element 146 and a forward angle iron frame element 144 (see FIG. 4). As explained in referring to FIG. 4A hereinafter, the lateral angle iron frame elements 140 and 142 act as points of support for stabilizer strut subassemblies used to stabilize the luggage carrier assembly as it is supported on a vehicle. Extending between the central portions of the frame elements 144 and 146 is a central, relatively large mounting channel, denominated generally by reference numeral 150.

The mounting channel 150 includes a base plate 152, and a pair of downwardly depending, substantially parallel side plates or flanges 154 and 156. The sides plates 154 and 156 have two pairs of aligned apertures to receive latching pins 162 and 164 (see FIG. 2) by means of which the luggage carrier assembly is detachably connected to a receiver post 12. Mounted on the rear side of the external subframe 30 are a pair of rearwardly projecting rollers 162 and 164 which are spaced on opposite sides of the subframe as shown in FIGS. 3 and 4.

In FIG. 4A of the drawings, there is illustrated one of a pair of spaced stabilizer strut subassemblies 338 which can be effectively used for stabilizing the opposite sides of the luggage carrier assembly at a time when it is mounted in the vertically upright travel position on a vehicle. Each stabilizer strut subassembly 338 includes a rigid elongated stabilizer arm 340 which is pivotally connected at its outer end to a respective one of the side frame elements 140 or 142 of the external subframe 30 (see FIGS. 4 and 4A). Each stabilizer strut subassembly 338 further includes an elongated, threaded bolt 342 having a flared, knurled head 343 which engages a threaded sleeve 344 secured around, and projecting outwardly from, the respective one of the side frame elements 140 and 142 as shown in FIG. 4A.

The stabilizer strut subassemblies 338 function to prevent lateral rocking of the luggage carrier assembly 10 about the receiver 12 at a time when the luggage carrier assembly is mounted in its upright travel position at the rear of a vehicle. When the luggage carrier subassembly 10 is to be pivoted downwardly described in greater detail, the threaded bolts 342 are released from the threaded sleeves 344. The luggage carrier assembly can then pivot about the points of pivotal connection of the rigid arms 340 to the frame elements 140 and 142 and into the position shown in FIG. 4A, and FIG. 13. This downward pivotal movement to place the luggage carrier assembly 10 in a horizontally extending position is hereinafter explained in greater detail.

The external subframe 30 is secured through several intermediate layers of material to the bottom portion of the internal framework 48 by suitable fasteners (not shown), such as screws. Thus, as shown in FIG. 6, there are located between the subframe 30 and the tubular inside frame elements 50b and 52b, a layer 161 of flexible fabric, overlying a panel 163 of smooth vinyl cushioning pad. This, in turn, bears flatly against a strong, rigid, flat lightweight panel or board, such as a Masonite ® panel 165, which bears against the tubular frame elements 90, 92, 68, 70, 50b, 52b and 54 of the inner framework 48. It may be here pointed out that when the described suitable fasteners are removed and no longer extend through and engage the internal framework 48, the entire, unitary fabric sleeve or envelope may be removed from the rigid frames of the luggage carrier assembly 10.

It will be noted from FIGS. 3 and 4 that the rollers 162 and 164 project rearwardly from the lower rear side of the luggage carrier subassembly a sufficient distance to protect a pair of rear tail lights 166 and 168 from being inadvertently bumped and broken as a result of impact with another vehicle, or any other obstruction. The projecting rollers 162 and 164 also function to afford some protection to an illuminated license plate holder, designated generally by reference numeral 170 and illustrated in FIGS. 2, 4, 9 and 10.

The illuminated license plate holder subassembly 170 is illustrated in FIGS. 9 and 10. The subassembly 170 includes a generally rectangular backing plate 172. A license pate receiving channel 174 extends along the upper edge of the backing plate and is concave in cross-section to receive the upper edge of license plate held against the backing plate 172 as shown in FIG. 5. In order to illuminate the license plate, a shaded light 176 is mounted over the top of the backing plated 172. A shade or shield element 180 directs the light rays downwardly so as to illuminate the license plate carried on the forward side of the backing plate 172.

The license plate receiving channel 174 is retained in that position by means of a pair of diagonal straps 184 and 186 which are secured to the back of the backing plate 172. The straps 184 and 186 engage, at their convergent upper ends, the opposite ends of a mounting plate 188 upon which the shield element 180 is mounted. The threaded base of the light bulb 176 is illustrated in FIG. 10, and the electrical lead thereto is denominated by reference numeral 190. The entire illuminated license plate holder subassembly 170 is mounted to the external subframe 30 by means of a mounting bracket 196.

The closure subassembly 32 of the luggage carrier assembly 10 includes a pair of side panels 200 and 202 and a composite arcuate central top panel 204. The side panel 202 includes a diagonally extending lower edge 206 lined with piping 207 and an arcuate upper edge 208. In similar fashion, the side panel 202 includes a diagonally extending lower edge 210 lined with a strip of piping 211 and an arcuate upper edge 212. The upper edges of the two side panels 200 and 202 are also aesthetically demarcated by suitable strips of piping material 214 (see FIGS. 2 and 3). The composite arcuate central panel 204 of the closure subassembly comprises a flexible outer fabric sheet or panel 220 and a flexible internal fabric panel 222 which will be explained, the outer and internal panels 220 and 222 are formed with a single sheet of flexible fabric material, and are constituted by doubleing back the panel 220 (see FIGS. 1, 6 and 11).

The fabric panels 220 and 222 are joined at their side edges and along their lower edges (by bending over) to form a hollow pocket or sleeve 223 (see FIGS. 6 and 11) substantially coextensive in size with the real size of the composite arcuate central panel 204. The opening to this pocket or sleeve 223 is shown in FIG. 6 and is denominated by reference numeral 226. An arcuate rigidifying frame subassembly 230 which corresponds generally in configuration to the arcuate shape of the closure subassembly 32 as it appears in FIGS. 1, 2 and 3, is illustrated in FIG. 14. The rigidifying frame subassembly 230 is inserted through the opening 226 into the pocket 223 formed between the external fabric panel 220 and the internal fabric panel 222.

The rigidifying frame subassembly 230 includes a rigid arcuate frame 232 (see FIG. 14), which has a large mesh wire panel 234 located within the generally rectangular, central opening therethrough. A soft, smooth vinyl pad 236 is secured to one side of the wire mesh panel which will be that convex side facing toward the outer fabric panel 220 so that the smooth vinyl cushioning pad 236 is placed in juxtaposition to the outer fabric panel 220 (see FIGS. 1 and 6).

When the rigidifying frame subassembly 230 is inserted through the opening 226 into the pocket 223 between the inner fabric panel 222 and the outer fabric panel 220, the closure subassembly 32 is given the shape or configuration depicted in FIGS. 1, 2, 3 and 5. The outer fabric panel 220 of the composite central panel 204 of the closure subassembly 32 is an extension or continuation of the outer fabric panel which is secured to the outer forward side of the luggage carrier assembly. This latter outer panel is denominated by reference numeral 235, and is illustrated best in FIGS. 6 and 7. The locus of the opening 22 into the pocket 223 also establishes the location where the terminal edge of the rigidifying frame subassembly 230 will be located when it is in inserted in this pocket. This edge also defines a pivotal axis about which the closure subassembly 32 is pivoted at a time when it is opened to an open position to allow luggage to be placed in, and taken out of, the luggage carrier assembly. This open position is illustrated in FIGS. 5, 11 and 12 of the drawings.

Along the rear lower edge of the closure subassembly 32, and secured to the outer fabric sheet or panel 220 are the pair of fastening belts 38 and 40, to which reference has previously been made. It is also perceptible from FIG. 3 that the fastening belts 38 and 40 are engaged, in the closed position of the closure subassembly 32, with the buckles 42 and 44.

In order to impart weather tight integrity to the closure subassembly 32, an internal sealing flap 244 is provided and has a length substantially equivalent to the transverse width across the internal framework 48. The sealing flap 244 has its upper edge secured to the internal fabric panel 222 while the lower portion of the sealing flap 244 hangs loosely, and can be tucked inside of the lower rear portion of the luggage carrier subassembly, as best illustrated in FIG. 6. Along the lower edge of the internal sealing flap 244, a pair of aligned elongated sleeves or tubes 246 are provided for the purpose of receiving a pair of rigid rods 247 which give some weight and definition to the lower edge portion of the sealing flap (see FIGS. 6 and 12). This assists in permitting the closure subassembly 32 to be propped open in an elevated position for the purpose of placing luggage in, and removing it from, the luggage carrier assembly in a manner hereinafter described.

The structural elements which are utilized to prop the closure subassembly 32 open in the position depicted in FIGS. 5, 11 and 12, include an elongated flexible arresting strap 250. The arresting strap 250 has one of its ends 252 secured to the internal fabric panel at the forward side of the luggage carrier assembly near the top thereof, as illustrated in FIG. 6. The opposite (rear) end 254 of the strap 250 is secured to a rigid structural web member forming a part of a U-shaped support bracket an hereinafter described.

In addition, the structural assembly by which the closure subassembly 32 is retained in the open position depicted in FIGS. 5 and 11 includes a pair of vertically extending upright posts 256 and 258. The posts 256 and 258 are disposed at the opposite sides of the interior of the luggage carrier assembly, and are rigidly positioned by reason of having their lower ends rigidly connected to the portions 50b and 52b of the tubular frame elements 50 and 52 forming a part of the internal frame 48. The posts 256 and 258 are best illustrated in FIGS. 6 and 11.

Pivotally secured to the upper ends of the two vertically extending upright posts 256 and 258 are the legs of a U-shaped support bracket, designated generally by reference numeral 266. The U-shaped support bracket 266 is best illustrated in FIG. 1 of the drawings, and includes a pair of opposed, substantially parallel, horizontally spaced legs 268 and 270 located adjacent the inner sides of the opposite sides of the luggage carrier assembly. The legs 268 and 270 each have one end pivotally connected to the upper end of one of the vertically extending posts 256 and 258 for pivotation about a horizontal axis. The opposite ends of the legs 268 and 270 are interconnected by the transversely extending elongated web member 272. The web member 272 is an elongated bar which is sized to pass between the sealing flap 244 and the internal fabric panel 222 of the closure subassembly 32. The propping position of the web member 272 is shown in FIGS. 5, 11 and 12 where the closure subassembly 32 is propped open to allow luggage to be placed inside the luggage carrier assembly.

At a time when the closure subassembly 32 is closed so as to protect and cover luggage carried inside the luggage carrier assembly 10, the U-shaped support bracket 266 is pivoted rearwardly into the position illustrated in full lines in FIG. 6. In this position, the elongated web member rod 272 is positioned in the upper forward corner of the closure subassembly so as to be out of the way, or to not interfere with, luggage stored within the luggage carrier subassembly. At this time, the elongated strap 250 hangs downwardly as a catenary along the inside of the luggage carrier subassembly in a position such that it does not interfere in any way with the luggage (see FIG. 6). In many cases, it will simply lie across the upper side of the luggage carried within the luggage carrier.

When the closure subassembly 32 is closed, its integrity against foul weather is substantially enhanced by providing a pair of flexible, foldable wind and rain flaps 273 and 275 secured to, and projecting from, the flexible back panel 235 immediately below the pivotal axis of the closure subassembly 32, as shown in FIGS. 2, 3 and 5. Suitable located cooperating strips of Velcro ® function to hold the rain flaps 273 and 275 closed when the closure subassembly 32 is closed.

The exposed external fabric portion of the luggage carrier assembly is formed, in a preferred embodiment, as a large, flexible bag, sleeve or envelope which tightly and neatly encircles the entire luggage carrier assembly and forms the water tight exterior surface thereof. Thus, the fabric panel 26 which is located at the lower rear side of the luggage carrier assembly 10 extends upwardly to the horizontally extending tubular frame element 100 of the internal framework 48 and is there folded over and down inside of the inner side of the internal framework. The lower edge of this fabric panel 26 inside the internal framework 48 is passed beneath a rigid internal bottom panel 167 as best illustrated in FIG. 6.

Positioned between the internal framework 48 and the elongated fabric panel 26 at the lower rear of the luggage carrier assembly 10 is an inwardly and downwardly folded soft smooth pad 27 which causes the overlying fabric panel 26 to be smooth and cushioned (see FIG. 6). The outer lower part of the fabric panel 26 passes on downwardly, and is folded into a horizontal section where it becomes the panel 161 and extends across the bottom of the luggage carrier assembly 10 between the external subframe 30, and an internal Masonite ® rigidifying floor 165. The same continuous sheet of flexible fabric turns and extends on up the forward side of the luggage carrier assembly 10 across the Masonite ® rigidifying sleeping and eating surface panel 120, and at this forwardly facing location, this fabric is identified by reference numeral 235, as shown in FIG. 6. At the top of the luggage carrier assembly, this same fabric extends outwardly and becomes the outer panel 220 of the closure assembly 34.

The internal fabric panel of the central composite panel of the closure subassembly 34 extends past the opening into which the rigidifying structure is placed, and passes down the inside part of the luggage carrier assembly inside the framework 48 and is placed underneath the internal rigid bottom panel 167 as shown in FIG. 6. At the opposite or lateral sides of the luggage carrier assembly, the fabric side panels 20 and 22 forming a part of the fabric bag, sleeve or envelope which is made as integral whole, pass across the vinyl pads 116 and 118 which function to make the fabric panels smooth and wrinkle-free. The fabric is then pulled tightly across the arcuate or curved portions 80a and 82a at the upper side of the side frame elements 80 and 82 of the internal frame 48. This is aided by the location of defining external strips of piping at the positions where the fabric is pulled across, and fits tightly against, the arcuate or curved portions 80a and 82a of the side frame elements 80 and 82. The elongated loose flaps of the flexible fabric are then passed down inside the two side walls of the internal frame 48 and ar placed under the rigid internal bottom panel 167 located internally of the luggage carrier assembly 10 as shown in FIG. 6.

In FIGS. 1-10 of the drawings, the luggage carrier assembly 10 is illustrated as it appears when it is mounted to the rear of a vehicle, such as the van 16, and extends vertically in its transport or over-the-road position for carrying luggage during a trip. The luggage carrier assembly 10 can also, however, be pivoted from the illustrated vertically extending position to a horizontally extending position in which the forward (van facing) side 18 thereof becomes a horizontally extending, substantially monoplanar surface rigidified by the inclusion in the material of
construction of the rigid panel made of Masonite ®, plywood or the like, earlier referred to by reference numeral 120. This panel 120 is shown in FIGS. 6, 7 and 8 of the drawings.

At times when the luggage carrier assembly 10 is to be pivoted downwardly to a horizontally extending position, as shown in my U.S. patent application Ser. No. 100,568, it is, in the embodiment of this invention illustrated in the drawings, pivoted about a horizontal axis. This horizontal pivotal axis extends through the pin 16 used used to connect the central mounting channel 150 of the lower outside subframe 30 to the receiver 12 of the van. At this time, the pin 162 has been extricated so that the luggage carrier assembly is free to pivot rearwardly and downwardly from the position shown in FIG. 2 to the position illustrated in FIG. 13.

When this pivoting action has been completed, the luggage carrier assembly extends horizontally and is supported at its forward end by the receiver 12 to which the central mounting channel 150 is still pinned, and by the stabilizer strut subassemblies 338. Further, more rearwardly located support is provided by a pair of substantially parallel legs 300 and 302 pivotally mounted to the upper portion of the tubular frame elements 50 and 52, which frame elements are depicted in FIG. 8. The mode of mounting the legs 300 and 302 is that the upper end portions of the legs are pivotally connected to a pair of mounting brackets 304 and 306, respectively. These brackets 304 and 306 are set against the forward (van facing) sides of the frame members 50 and 52 between the remainder of the luggage carrier assembly and the van, as shown in FIGS. 2 and 3 of the drawings.

A pair of handles 308 and 310 is provided immediately adjacent the legs 300 and 302. At a time when it is desired to pivot the luggage carrier assembly from its vertically extending travel or over-the-road position to a horizontally extending sleeping or eating surface position, the handles 308 and 310 are readily accessible for use for this purpose. Indeed, the user of the luggage carrier assembly is reminded of the need to lower the legs 300 and 302, as the handles 308 and 310 are used, by the close proximity of the handles to the place where the legs are pivotally supported on the tubular frame members 50 and 52.

The handles 308 and 310 are utilized to lower the luggage carrier assembly 10 to the horizontally extending position after the legs 300 and 302 have been pivoted to the position shown in FIG. 13. The legs can be retained in this position by any suitable latching mechanism (not shown). At this time, the closure assembly 32 is, of course, retained in a closed position by means of the latching elements 38 and 40, and the buckles 42 and 44. It will be noted, in referring to FIGS. 8 and 13 that, should it be desirable to detach the luggage carrier assembly from the receiving bar 12 at this time, and roll it into a motel or the like, this can be accomplished by removing the latching pin 164, and moving the legs, after unlatching them, into a luggage carrier assembly-rolling position, as shown in dashed lines in FIG. 13. In this position, the legs 300 and 302 are again latched so that they can be used as handles to roll the luggage carrier assembly 10 along wheel barrow-like. In doing this, the principle weight of the luggage carrier assembly is bourne by the wheels 162 and 164.

From the foregoing description of the luggage carrier assembly of the invention, it will be perceived that several significant features are provided which afford marked advantage over similar types of luggage carrying enclosures which have been heretofore proposed and manufactured. By the use of an integrally formed unitary fabric envelope or sleeve, the entire luggage carrier assembly can be made to have a double thickness of canvas or other fabric smoothly presented at the exterior surface thereof by reason of the inclusion of soft smooth pads between the external fabric and the internal framework. This external sleeve or envelope can be quickly completely removed from the internal framework 48 at a time when a very few fastening elements are removed from the bottom of the luggage carrier assembly so as to detach the external subframe 30 from the bottom of the internal frame 48. This releases the fabric from the only points of attachment to the rigidifying frame elements of the luggage carrier subassembly, and the entire envelope of flexible fabric can be pulled off the internal frame to permit repair of that frame, washing or laundering of the fabric and general overall maintenance and repair when needed.

The ease with which the closure subassembly 32 can be lifted to its luggage-admitting and removing position, and propped there until the user of the luggage carrier assembly has completed the insertion or removal of luggage is another feature of the present invention not shared by the prior art devices.

Yet another important aspect of the invention is the characteristic which enables the luggage carrier assembly to be pivoted downwardly from an upwardly extending, over-the-road or transport position into a horizontally extending position in which it can be used for seeping or eating by reason of the rigid panel or plate which is carried at the forward side of the luggage carrier assembly and which forms a horizontally extending rigid surface when it is folded downwardly to the horizontally extending position shown in FIG. 13.

Finally, the luggage carrier assembly can be quickly detached from the vehicle upon which it is mounted and, with the luggage intact and sealed in a weather tight fashion therein, rolled to a location where the luggage is to be unloaded.

Although certain preferred embodiments of the invention have been herein described in order to better illustrate the basic principles upon which the invention is bottomed, it will be understood that various changes and innovations can be made in the described and illustrated structure without departure from these basic principles. Changes and innovations of that type are therefore deemed to be circumscribed by the spirit and scope of the invention, except as the same may be necessarily limited by the appended claims, or reasonable equivalents thereof.

What is claimed is:

1. A luggage carrier assembly comprising:
an inner tubular frame having a forward side, a rear side, a pair of opposed lateral sides and a bottom, said frame having a luggage-admitting opening at the top thereof;
a flexible outer fabric cover covering said inner tubular frame;
smoothing, cushioning panels positioned between said inner frame and said flexible outer fabric cover;
a rigid closure subassembly of arcuate cross-section in a vertical plane, said rigid closure subassembly being pivotally connected to the forward side of said inner frame at the top of said inner frame and pivotable about a horizontal axis from an open position in which the closure subassembly is lifted upwardly to admit luggage into, and allow the removal of luggage from, the interior of said luggage carrier assembly;
a rigid panel secured across the forward side of said tubular frame to form an eating surface in one position of said luggage carrier;
a lower external subframe having a forward side and a rear side on the outer side of said flexible fabric outer cover and secured through said fabric cover to the bottom side of said inner tubular frame, said external subframe including means for detachably mounting said subframe to an automotive vehicle for pivotation from a substantially horizontally extending transport position to a vertically extending static position;
means for locking said external subframe in a horizontally extending transport position; and
rearwardly extending spaced rollers mounted upon the rear side of said external subframe when said subframe extends substantially horizontally, and said rollers being positioned on said subframe for ground engagement when said external subframe is pivoted downwardly about a horizontal axis into a substantially vertically extending position.

2. A luggage carrier assembly as defined in Claim 1 and further characterized as including a folding bar subassembly positioned inside said inner frame and foldable from a passive position adjacent the forward side of said inner frame to a supporting position in which said folding bar subassembly supports said closure subassembly in a raised, open position.

3. A luggage carrier assembly as defined in claim 1 and further characterized as including a pair of lateral stabilizer strut subassemblies disposed at opposite sides of said lower external subframe, and including arms pivotally connected to said external subframe at opposite sides thereof, and on opposite sides of said means detachably mounting said external subframe to an automotive vehicle for pivotation of the subframe between said positions.

4. A luggage carrier assembly as defined in claim 1 and characterized as including a pair of horizontally spaced, parallel legs each pivotally mounted to said inner frame at the upper forward side thereof and pivotable from a first, transport position to a second, supporting position in which the legs extend downwardly along the lateral sides of the inner frame for supporting the luggage carrier in a static position by contacting the free ends of the legs with the ground.

5. A luggage carrier assembly as defined in claim 4 and further characterized as including a pair of lateral stabilizer strut subassemblies disposed at opposite sides of said lower external subframe, and including arms pivotally connected to said external subframe at opposite sides thereof, and on opposite sides of said means detachably mounting said external subframe to an automotive vehicle for pivotation of the subframe between said positions.

6. A luggage carrier assembly as defined in claim 1 and further characterized as including a license plate holder subassembly mounted to the external subframe, said license plate holder subassembly comprising:
a generally rectangular backing plate;
a license plate receiving channel secured to, and extending along the upper edge of, the backing plate;
a light shield element;
a light mounted in the light shield element; and
a pair of straps secured to the back of said backing plate and having upper end portions secured to, and positioning, said light shield element.

7. A luggage carrier assembly comprising:
a rigid inner frame having a substantially monoplanar forward side, a rear side, a pair of opposed lateral sides and a bottom, said frame having a luggage-admitting opening at the top thereof;
a cover covering said inner frame except at said top opening;
a lower external subframe having a forward side and a rear side on the bottom, outer side of said inner frame and outside of, and against, said cover, and said subframe being secured to said inner frame through said cover, said external subframe including means for detachably mounting said subframe to an automotive vehicle for pivotation from a substantially horizontally extending transport position to a vertically extending static position;
a rigid closure subassembly of arcuate cross-section in a vertical plane, said rigid closure subassembly being pivotally connected to the forward side of said inner frame at the top of said inner frame and pivotable about a horizontal axis from an open position in which the closure subassembly is lifted upwardly to admit luggage into, and allow the removal of luggage from, the interior of said luggage carrier assembly, to a closed position closing the opening at the top of said rigid inner frame;
rearwardly extending spaced rollers mounted upon the rear side of said external subframe when said external subframe extends substantially horizontally, said rollers being positioned on said subframe for ground engagement when said external subframe is pivoted downwardly about a horizontal axis into a substantially vertically extending position;
a pair of supporting legs pivotally mounted on opposite sides of said inner frame and outside said cover for pivotation about a horizontal axis from a first, transport position alongside said opposed lateral sides of said inner frame, to a second, static position in which said legs extend normal to the plane of said substantially monoplanar forward side of said inner frame and extend along, and confine the opposed lateral sides of, said rigid inner frame and the cover which covers said inner frame whereby said legs, along with said rollers, can support said luggage carrier assembly on the ground when said subframe is pivoted to said vertically extending static position, and the forward side of said inner tubular frame is oriented in a substantially horizontally extending plane to form with said cover, a suitable eating surface.

8. A luggage carrier assembly as defined in claim 7 and further characterized as including a folding bar subassembly positioned inside said inner frame and foldable from a passive position adjacent the forward side of said inner frame, to a supporting position in which said folding bar subassembly supports said closure subassembly in a raised, open position.

9. A luggage carrier assembly as defined in claim 7 wherein said cover is continuous around said inner frame and thus deters water from entering the space inside said rigid inner frame.

10. A luggage carrier assembly as defined in claim 7 and further characterized as including cushioning panels between said rigid inner frame and said cover at the location of said rear side and opposed lateral sides.

11. A luggage carrier assembly comprising:
a luggage enclosure having a substantially monoplanar rigid forward side having an upper edge, a substantially monoplanar rear side having an upper edge, a pair of opposed, parallel lateral sides each having an upper edge, and a bottom, and said luggage enclosure having a luggage-admitting opening at the top thereof;
a rigid closure subassembly of arcuate cross-section in a vertical plane extending normal to the plane of said forward side and having a pair of parallel side walls, and rigid closure subassembly being pivotally connected to the upper edge of the forward side of said luggage enclosure and pivotable about a horizontal axis from an open position in which the closure subassembly is lifted upwardly to admit luggage into, and allow removal of the luggage from, the interior of the luggage carrier assembly, to a closed position in which said rigid closure subassembly closes the opening at the top of said luggage enclosure; and
means for sealing between said rigid closure subassembly and the upper edges of said forward side and rear side of said luggage enclosure;
a lower external subframe on the outer side of said luggage enclosure below the bottom thereof and secured to the bottom of said luggage enclosure, said external subframe including means for detachably mounting said external subframe to an automotive vehicle for pivotation from a substantially horizontally extending transport position to a vertically extending static position;
means for locking said subframe in said horizontally extending transport position;
rearwardly extending, horizontally spaced rollers mounted at a location adjacent the intersection of said monoplanar rear side and said bottom;
a folding bar subassembly positioned inside of said luggage enclosure and foldable from a passive position adjacent the forward side of said luggage enclosure to a supporting position in which said folding bar subassembly supports said rigid closure subassembly in a raised, open position, said folding bar subassembly comprising:

a pair of laterally spaced, upwardly extending posts mounted inside said luggage enclosure adjacent the opposed, parallel spaced sides thereof; and
a U-shaped closure support bracket including:
a pair of spaced legs pivotally connected to the upper ends of said laterally spaced posts for pivotation about a common horizontal axis; and
a transversely extending elongated web member interconnecting said legs at their ends opposite the ends thereof pivotally connected to the upper ends of said laterally spaced posts, said U-shaped closure support bracket being pivotable from a position in which said elongated web bar is positioned in the passive position adjacent the forward side of said luggage enclosure to a supporting position in which said transversely extending elongated web member is positioned above and to the rear of said enclosure and in a position to support said rigid closure subassembly in an opened position.

12. A luggage carrier assembly as defined in claim 11 wherein said luggage enclosure comprises:
an internal framework having a forward side, a bottom side and a rear side; and
a rigid panel secured to the forward side of said internal framework to form an eating and sleeping surface in one position of said luggage enclosure.

13. A luggage carrier assembly comprising:
an inner frame having a vertically extending forward side, a rear side, a pair of opposed lateral sides and a bottom, said frame having a luggage-admitting opening at the top thereof;
a flexible outer cover covering said inner frame;
a closure subassembly of arcuate cross-section in a vertical plane extending substantially normal to the forward side of said inner frame, said rigid closure subassembly being pivotally connected to the forward side of said inner frame at the top of said inner frame, and pivotable about a horizontal axis from an open position in which the closure subassembly is lifted upwardly to admit luggage into, and allow the removal of luggage from, the interior of said luggage carrier assembly;
a rigid panel secured across the forward side of said frame to form a suitable surface for supporting luggage and articles when said tubular frame is pivoted through 90° so that said forward side thereof extends horizontally;
a lower external subframe having a forward side and a rear side on the outer side of said flexible outer cover and secured through said outer cover to the bottom side of said inner frame, said external subframe including means for detachably mounting said external subframe to the rear side of an automotive vehicle for pivotation from a substantially horizontally extending transport position to a vertically extending static position in which said rigid panel extends substantially horizontally;
means for locking said external subframe in a horizontally extending transport position with said rigid panel extending vertically, and positioned adjacent a vehicle upon which said luggage carrier assembly is mounted; and
rearwardly extending, horizontally spaced rollers mounted upon the rear side of said external subframe when said subframe extends substantially horizontally in the transport position, said rollers being positioned on said subframe for ground engagement when said external subframe is pivoted downwardly about a horizontal axis into a substantially vertically extending position.

14. A luggage carrier assembly comprising:

a luggage enclosure having an open top and having a rigid forward side, a rear side, a pair of opposed lateral sides and a bottom;

a rigid closure subassembly of arcuate cross-section in a vertical plane, said rigid closure subassembly being pivotally connected to the rigid forward side of the top of said luggage enclosure, and pivotable about a horizontal axis from a closed position to an open position in which the closure subassembly is lifted upwardly to admit luggage into the open top of said luggage enclosure, and allow the removal of luggage from the interior of said luggage enclosure, said rigid closure subassembly further including a pair of opposed, parallel sides which, when said rigid closure subassembly is closed, sealingly engage, and overlap, the opposed parallel lateral sides of said luggage enclosure;

a lower external subframe on the outer side of said luggage enclosure and secured to the bottom side of said luggage enclosure;

means for detachably mounting said subframe to an automotive vehicle for pivotation from a substantially horizontally extending transport position in which said lower external subframe supports said luggage enclosure, to a vertically extending static position in which said luggage enclosure is pivoted down so that said rigid forward side thereof extends horizontally and forms an eating and sleeping surface;

means for locking said external subframe in the horizontally extending transport position;

a folding bar subassembly positioned inside said luggage enclosure and foldable from a passive position adjacent the forward side of said luggage enclosure to a supporting position in which said folding bar subassembly supports said rigid closure subassembly in a raised, open position for allowing luggage to be passed into, and taken out of, said luggage enclosure; and a license plate holder subassembly mounted to said external subframe, said license plate holder subassembly comprising:

a generally rectangular backing plate;

a license plate receiving channel secured to, and extending along the upper edge of, the backing plate;

a light shield element; and strap elements secured to the back of said backing plate and having upper end portions secured to, and positioning, said light shield element at a location above said license backing plate.

15. A luggage carrier assembly comprising:

an inner tubular frame having a forward side, a rear side, a pair of opposed lateral sides and a bottom, said frame having a luggage-admitting opening at the top thereof, and said inner frame further being made up of a plurality of interconnected tubular members which include:

a first pair of opposed, spaced, parallel, lateral frame elements of generally L-shaped configuration, each of said frame elements in said first pair having an upper end and each including:

an elongated, vertically extending portion forming a part of the forward side of said inner frame, and forming, in addition, a part of one of the lateral sides of said inner tubular frame; and a lower portion extending substantially normal to said vertically extending portion, each of said lower portions forming parts of the bottom of said inner tubular frame and extending rearwardly from the forward side of said inner tubular frame;

a second pair of horizontally spaced, parallel, lateral frame elements each having an upper end and a lower end and each including:

a vertical portion spaced rearwardly from the vertical portion of one of said frame elements in said first pair of frame elements, and extending substantially parallel thereto, said vertical portion of said frame element in said second pair forming a part of the rear side of said inner tubular frame; and a top portion interconnected to the vertical portion of the respective frame element in said second pair, and connected to the respective vertical portion by an arcuate portion, said second pair of frame elements having each of the frame elements therein connected at its upper end to an upper end of one of the frame elements in said first pair and having its lower end connected to the lower portion of the same frame element of said first pair to which the upper end thereof is connected;

a flexible outer fabric cover covering said inner tubular frame;

smoothing, cushioning panels positioned between said inner frame and said flexible outer fabric cover;

a rigid closure subassembly of arcuate cross-section in a vertical plane, said rigid closure subassembly being pivotally connected to the forward side of said inner frame at the top of said inner frame and pivotable about a horizontal axis from an open position in which the closure subassembly is lifted upwardly to admit luggage into, and allow the removal of luggage from, the interior of said luggage carrier assembly, to a closed position;

a rigid panel secured across the forward side of said tubular frame to form an eating surface in one position of said luggage carrier;

a lower external subframe having a forward side and a rear side on the outer side of said flexible fabric outer cover and secured through said fabric cover to the bottom side of said inner tubular frame, said external subframe including means for detachably mounting said subframe to an automotive vehicle for pivotation from a substantially horizontally extending transport position to a vertically extending static position;

means for locking said external subframe in a horizontally extending transport position; and rearwardly extending spaced rollers mounted upon the rear side of said external subframe when said subframe extends substantially horizontally, and said rollers being positioned on said subframe for ground engagement when said external subframe is pivoted downwardly about a horizontal axis into said substantially vertically extending position.

16. A luggage carrier assembly as defined in claim 15 wherein the vertically extending portion and the lower portion of each of said opposed, parallel lateral frame elements in said first pair of frame elements are integrally formed with each other, and are made of a single tube in the case of each of said lateral frame elements in said lateral pair.

17. A luggage carrier assembly comprising:

an inner tubular frame having a top, a forward side, a rear side, a pair of opposed lateral sides and a bottom, said frame having a luggage-admitting opening in the top thereof;

a flexible outer fabric cover covering said inner tubular frame;

smoothing, cushioning panels positioned between said inner tubular frame and said flexible outer fabric cover;

a rigid closure subassembly of arcuate cross-section in a vertical plane, said rigid closure subassembly being pivotally connected to the forward side of said inner frame at the top of said inner frame and pivotable about a horizontal axis from an open position in which the closure subassembly is lifted upwardly to admit luggage into, and allow the removal of luggage from, the interior of said luggage carrier assembly, to a closed position, said rigid closure subassembly comprising:

a pair of opposed, substantially parallel flexible side panels; and a composite, arcuate central top panel comprising:
a flexible outer panel element;
a flexible inner panel element joined to said flexible outer panel element along edges thereof to form a pocket between said inner and outer panel elements having an opening thereinto adjacent an edge of said inner panel; and
an arcuate rigidifying frame subassembly removably positioned in said pocket between said inner and outer panel elements and imparting an arcuate configuration to said arcuate central top panel, with the arcuate line thereof lying in a plane extending perpendicular to said side panels;

a rigid panel secured across the forward side of said tubular frame to form an eating surface in one position of said luggage carrier;

a lower external subframe having a forward side and a rear side on the outer side of said flexible fabric outer cover and secured through said fabric cover to the bottom side of said inner tubular frame, said external subframe including means for detachably mounting said subframe to an automotive vehicle for pivotation from a substantially horizontally extending transport position in which said subframe has a forward side and a rear side to a vertically extending static position;

means for locking said external subframe in a horizontally extending transport position; and rearwardly extending spaced rollers mounted upon the rear side of said external spaced rollers mounted upon the substantially horizontally, and said rollers being positioned on said subframe for ground engagement when said external subframe is pivoted downwardly about a horizontally axis into a substantially vertically extending position.

18. A luggage carrier assembly as defined in claim 17 and further characterized as including a pair of lateral, stabilizer strut subassemblies disposed at opposite sides of said lower external subframe, and including arms pivotally connected to said external subframe at opposite sides thereof, and on opposite sides of said means detachably mounting said external subframe to an automotive vehicle for pivotation of the subframe between said horizontal and vertical positions.

19. A luggage carrier assembly comprising:

a rigid inner frame having a top, a substantially monoplanar forward side, a rear side, a pair of opposed lateral sides and a bottom, said frame having a luggage-admitting opening at the top thereof;

a cover covering said inner frame except at said top opening;

a lower external subframe having a forward side and a rear side on the bottom, outer side of said inner frame and outside of, and against, said cover, and said subframe being secured to said inner frame through said cover, said external subframe including means for detachably mounting said subframe to an automotive vehicle for pivotation from a substantially horizontally extending transport position to a vertically extending static position;

a rigid closure subassembly of arcuate cross-section in a vertical plane, said rigid closure subassembly being pivotally connected to the forward side of said inner frame at the top of said inner frame and pivotable about a horizontal axis from an open position in which the closure subassembly is lifted upwardly to admit luggage into, and allow the removal of luggage from, the interior of said luggage carrier assembly, to a closed position closing the opening at the top of said rigid inner frame, said rigid closure subassembly further including a removable rigidifying frame subassembly;

rearwardly extending spaced rollers mounted upon the rear side of said external subframe when said external subframe extends substantially horizontally, said rollers being positioned on said subframe for ground engagement when said external subframe is pivoted downwardly about a horizontal axis into a substantially vertically extending position; and a pair of supporting legs pivotally mounted on opposite sides of said inner frame and outside said cover for pivotation about a horizontal axis from a first, transport position alongside said opposed lateral sides of said inner frame, to a second, static position in which said legs extend normal to the plane of said substantially planar forward side of said inner frame, and extend along and across the opposed lateral sides of said rigid inner frame and the cover which covers said inner frame, whereby said legs, along with said rollers, can support said luggage carrier assembly on the ground when said subframe is pivoted to said vertically extending static position, and the forward side of said inner tubular frame is oriented in a substantially horizontally extending plane to form, with said cover, a surface suitable for eating.

20. A luggage carrier assembly comprising:

an inner frame having a top, a forward side, a rear side, a pair of opposed lateral sides and a bottom, said frame having a luggage-admitting opening at the top thereof, and said inner frame further being made up of a plurality of interconnected members which include:

a first pair of opposed, spaced, substantially parallel, lateral frame elements of generally L-shaped configuration, each of said frame elements in said first pair having an upper end and each including:

a vertically extending portion forming a part of the forward side of said inner frame, and forming, in addition, a part of the lateral side of said inner frame; and a lower portion extending substantially normal to said vertically extending portion, each of said lower portions forming parts of the bottom of said inner frame and extending rearwardly from the forward side of said inner frame;

a second pair of horizontally spaced, substantially parallel, lateral frame elements each having an upper end and each including:

a vertical portion spaced rearwardly from the vertically extending portion of one of said frame elements in said first pair of frame elements, and extending substantially parallel thereto, said vertical portion of each of said frame elements in said second pair forming a part of the rear side of said inner frame; and a top portion interconnected to the vertical portion of each of the respective frame elements in said second pair, and connected to the respective vertical portion by an arcuate portion, said second pair of frame elements having each of the frame elements therein connected at its upper end to said upper end of one of the frame elements in said first pair, and having its lower end connected to an end of the same frame element of said first pair to which the upper end thereof is connected;

a flexible outer fabric cover covering said inner frame;

smoothing, cushioning panels positioned between said inner frame and said flexible outer fabric cover;

a rigid closure subassembly of arcuate cross-section in a vertical plane, said rigid closure subassembly being pivotally connected to the forward side of said inner frame at the top of said inner frame and pivotable about a horizontal axis from an open position, in which the closure subassembly is lifted upwardly to admit luggage into, and allow the removal of luggage from, the interior of said luggage carrier assembly, to a closed position;

a rigid panel secured across the forward side of said inner frame to form an eating surface in one position of said luggage carrier;

a lower external subframe having a forward side and a rear side on the outer side of said flexible fabric outer cover and secured through said fabric cover to the bottom side of said inner frame, said external subframe including means for detachably mounting said subframe to an automotive vehicle for pivotation from a substantially horizontally extending transport position in which said subframe has a forward side and a rear side to a vertically extending static position;

means for locking said external subframe in a horizontally extending transport position; and rearwardly extending spaced rollers mounted upon the rear side of said external subframe when said subframe extends substantially horizontally, said rollers being positioned on said subframe for ground engagement when said external subframe is pivoted downwardly about a horizontal axis into a substantially vertically extending position.

* * * * *

UNITED STATES PATENT AND TRADEMARK OFFICE
CERTIFICATE OF CORRECTION

PATENT NO. : 5,056,695

DATED : October 15, 1991

INVENTOR(S) : Allen L. Giblet

It is certified that error appears in the above-identified patent and that said Letters Patent is hereby corrected as shown below:

In Column 6, line 48, delete "buckes" and insert -buckles-.
In Column 9, line 17, after "downwardly" insert -to the horizontally extending position, as hereinafter-.
In Column 10, line 29, delete "real" and insert -areal".
In Column 10, line 60, delete "22" and insert -226-.
In Column 11, line 51, delete "1" and insert -11-.
In Column 13, line 8, delete "ar" and insert -are-.
In Column 13, line 32, delete "16" and insert -164-.
In Column 14, line 53, delete "seeping" and insert -sleeping-.
In Column 21, line 60, after the word "external" insert -subframe when said subframe extends-, and then delete "spaced rollers mounted upon the" which appears at the end of line 60 and at the beginning of line 61.

Signed and Sealed this

Thirtieth Day of March, 1993

*Attest:*

STEPHEN G. KUNIN

*Attesting Officer*     *Acting Commissioner of Patents and Trademarks*